(12) United States Patent
Zamir et al.

(10) Patent No.: US 11,144,801 B2
(45) Date of Patent: Oct. 12, 2021

(54) GENERATING CONTROL DATA FOR A PRINTING SYSTEM

(71) Applicant: Hewlett-Packard Development Company, L.P., Spring, TX (US)

(72) Inventors: Raz Zamir, Ness Ziona (IL); Shlomi Ben David, Ness Ziona (IL)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/756,278

(22) PCT Filed: Dec. 19, 2017

(86) PCT No.: PCT/US2017/067340
§ 371 (c)(1),
(2) Date: Apr. 15, 2020

(87) PCT Pub. No.: WO2019/125414
PCT Pub. Date: Jun. 27, 2019

(65) Prior Publication Data
US 2020/0334506 A1 Oct. 22, 2020

(51) Int. Cl.
*G06F 3/12* (2006.01)
*G06K 15/02* (2006.01)

(52) U.S. Cl.
CPC ....... *G06K 15/1801* (2013.01); *G06K 15/027* (2013.01)

(58) Field of Classification Search
CPC ............. G06K 15/1801; G06K 15/027; H04N 1/6033; H04N 1/6044; H04N 1/6047; H04N 1/6055
See application file for complete search history.

(56) References Cited

U.S. PATENT DOCUMENTS

| | | |
|---|---|---|
| 6,671,086 B1 | 12/2003 | Wang et al. |
| 8,416,466 B2 | 4/2013 | Takata |
| 9,013,762 B2 | 4/2015 | Meschede |
| 2003/0042299 A1 | 3/2003 | Swanson |
| 2004/0105128 A1* | 6/2004 | Sano ................... H04N 1/3875 358/1.18 |
| 2010/0110460 A1* | 5/2010 | Miyata ............... H04N 1/00838 358/1.9 |

(Continued)

FOREIGN PATENT DOCUMENTS

| | | |
|---|---|---|
| EP | 2000954 | 12/2008 |
| EP | 2530579 | 12/2012 |

(Continued)

OTHER PUBLICATIONS

Munoz, R et al., Real-time Digital Myoelectric Pattern Detector System, Oct. 31-Nov. 3, 1996, http://ieeexplore.ieee.org/document/656827/.

*Primary Examiner* — Moustapha Diaby
(74) *Attorney, Agent, or Firm* — Brooks Cameron & Huebsch PLLC (57) ABSTRACT

A method of generating control data for a printing system includes receiving image data comprising an image to be printed by the printing system, determining a presence of a control mark in the image data, and generating control data for the printing system based on the control mark, the control data including at least an indication of the presence of the control mark.

15 Claims, 7 Drawing Sheets

(56) References Cited

U.S. PATENT DOCUMENTS

| | | | |
|---|---|---|---|
| 2011/0199648 A1* | 8/2011 | Sakuraba | G06F 3/1285 358/1.18 |
| 2012/0194791 A1 | 8/2012 | Duss et al. | |
| 2018/0253263 A1 | 9/2018 | Hower et al. | |

FOREIGN PATENT DOCUMENTS

| | | |
|---|---|---|
| GB | 2542569 A | 3/2017 |
| KR | 20100138218 | 12/2010 |
| WO | 2014206496 A1 | 12/2014 |

* cited by examiner

GENERATING CONTROL DATA FOR A PRINTING SYSTEM

BACKGROUND

Printing devices are arranged to printing fluid, such as ink, on to substrates. A component of a printing system, such as a Digital Front End (DFE), receives an image to be printed and can instruct a printing apparatus to print control marks at specific locations on the substrate. Once the image and control marks have been printed, the control marks can be read by a human and/or an imaging device. Example control marks may include registration marks, used to help ensure that the print is aligned properly.

BRIEF DESCRIPTION OF THE DRAWINGS

Various features of the present disclosure will be apparent from the detailed description which follows, taken in conjunction with the accompanying drawings, which together illustrate features of the present disclosure, and wherein.

DETAILED DESCRIPTION

In the following description, for purposes of explanation, numerous specific details of certain examples are set forth. Reference in the specification to "an example" or similar language means that a particular feature, structure, or characteristic described in connection with the example is included in at least that one example, but not necessarily in other examples.

As described herein, an example printing system comprises a digital front end comprising a processor and memory. The printing system further comprises a printing apparatus communicatively coupled to the digital front end. The digital front end is configured to receive image data comprising an image to be printed by the printing apparatus, and to determine a presence of a control mark in the image data. The digital front end is further configured to generate control data based on the control mark, where the control data includes an indication of the presence of the control mark. The digital front end is further configured to transmit the control data to the printing apparatus.

An example digital front end (DFE) may be embodied as a computer system, and a user wishing to print one or more images as part of a print job, may upload, transfer, or make available one or more digital files, so that they are accessible by the DFE. In broad terms, the DFE prepares the digital files for printing, and formats the files so that a printer can print the images.

In an example workflow process, a user may create a document for printing using specific design software. The digital file created may be formatted in a page description language, which describes the appearance of the printed page. Example page description languages include Personalized Print Markup Language (PPML), Job Layout (JLYT), Printer Command Language (PCL) and PostScript, among others. Alternatively, the digital file may comprise an image file such as a Tagged Image File Format (TIFF) file or a Joint Photographic Experts Group (JPEG) file. The user may then upload or transfer the file to a printing system so that it can be processed by a DFE. Before printing, the digital file may need to be converted to a format that can be interpreted by a printing apparatus. As such, one function of the DFE may be to rasterize the file to convert the file to raster data, such as a bitmap. Hence, in some examples the DFE incorporates Raster Image Processing techniques if the digital file is in a format that cannot be interpreted by the printing apparatus. The converted file can then be transmitted to the printing apparatus so that the image can be printed.

In comparative systems, the DFE may also add one or more control marks to the digital file before or after the file has been converted to a bitmap. A printing technician may control whether these are applied by the DFE or not. These control marks are then printed onto the substrate along with an image. For example, these control marks are usually printed in peripheral regions of the substrate in a region outside of the printed image.

These control marks can help a human operator determine whether the image printed onto the substrate is an accurate representation of the image that was intended to be printed. For example, an example control mark may include a registration mark, used to ensure that each colour separation, such as Cyan, Magenta, Yellow and Black separations, are printed in alignment. If the printed registration mark does not appear as expected once printed, the operator may need to calibrate the printer apparatus before re-printing the image. For example, they may need to alter the alignment settings. Another example control mark may include crop marks. These include lines printed onto the substrate to indicate where the substrate should be trimmed and cut.

In certain comparative systems, the registration calibration procedure and/or the trimming can be an automated process. For example, imaging equipment, such as cameras or scanners can image the printed substrate to detect the control marks. Once detected, the printing apparatus may then automatically trim the substrate at the locations indicated, and/or apply a registration calibration procedure, if one is suitable, based on the appearance of the registration mark.

In these comparative systems, the DFE is aware of the presence and/or location of the control marks as a result of these being added by, or within, the DFE. However, some users prefer to add these control marks themselves before submitting a print job to the DFE. For example, the control marks may already be embedded in the images present in a page description language file received by the DFE. The DFE is therefore unaware of the presence of these control marks because, to the DFE, they are indistinguishable from the image to be printed.

Certain examples described herein provide a system whereby a DFE can detect or determine a presence of control marks in a digital file created by a user. Hence, control marks added by a user anywhere within the digital file can be detected. After detection, the DFE generates control data based on the control mark and transmits this control data to the printing apparatus. Accordingly, the DFE and printing apparatus are aware of the presence of these control marks, regardless of whether they were added by a user as part of the design process, or by the DFE.

Figure 1:
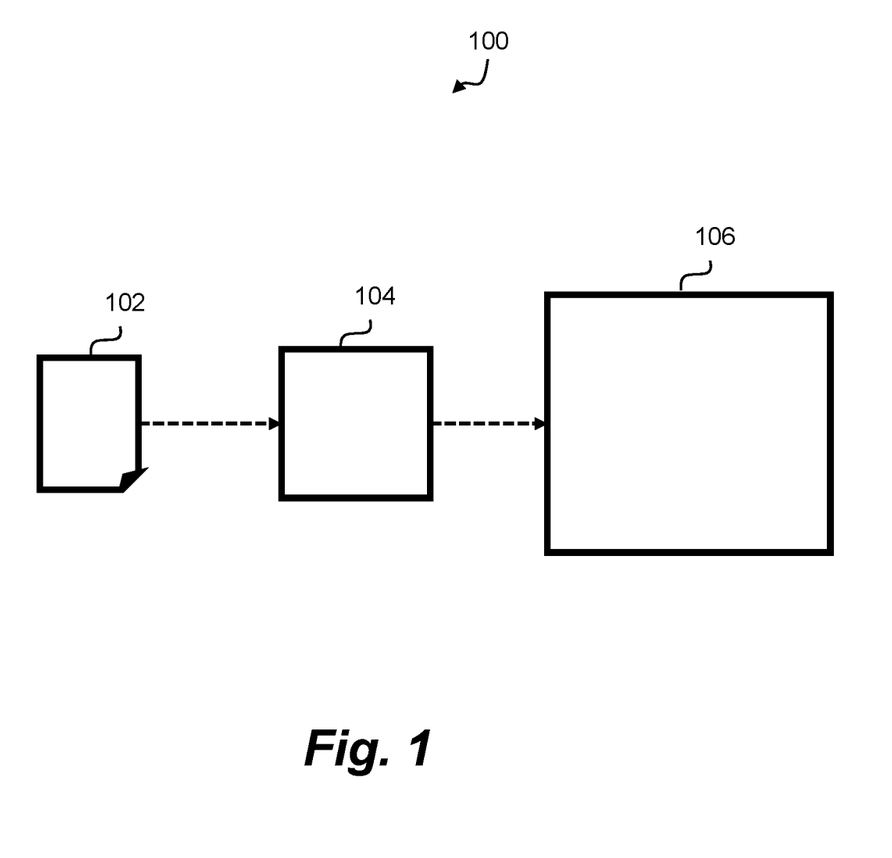
FIG. 1 is a diagrammatic representation of a printing system in accordance with an example.

FIG. 1 is a diagrammatic representation of a printing system 100 in accordance with an example. In the printing system 100, print job data is received by a digital front end 104. The digital front end (DFE) 104 may be a computer system comprising one or more processors and memory, e.g. may be implemented via at least one processor executing computer program code retrieved from the memory. Regardless of form, the DFE may implement an application programming interface (API) configured to receive the print job data.

Print job data includes image data 102 which comprises, or is associated with an image to be printed by a printing apparatus 106. The image data may represent an image, or images, comprising a plurality of pixel values. The image data may be in any format, such as Portable Document Format (PDF), JLYT, or JPEG, for example. The image may form the entirety of the image data (e.g. in the case of a TIFF or JPEG file) or the image data may be extracted from a given file format. The print job data may also comprise additional data associated with the print job, such as settings, preferences or options. The image data 102 and/or print job data may be received from computing components communicatively coupled to the DFE 104, e.g. from a client device, an email server, or a network storage device. Upon receipt, the DFE 104 processes the image data 102 and print job data in order to print an image contained within the image data 102 using the printing apparatus 106. Processing the data comprises, amongst other things, determining a presence of a control mark in the image data and generating control data based on the control mark, where the control data includes an indication of the presence of the control mark. This control data can be transmitted to the printing apparatus 106. The printing apparatus 106 may comprise one or more pre-print or post-print components and a printer, for example.

Figure 2:
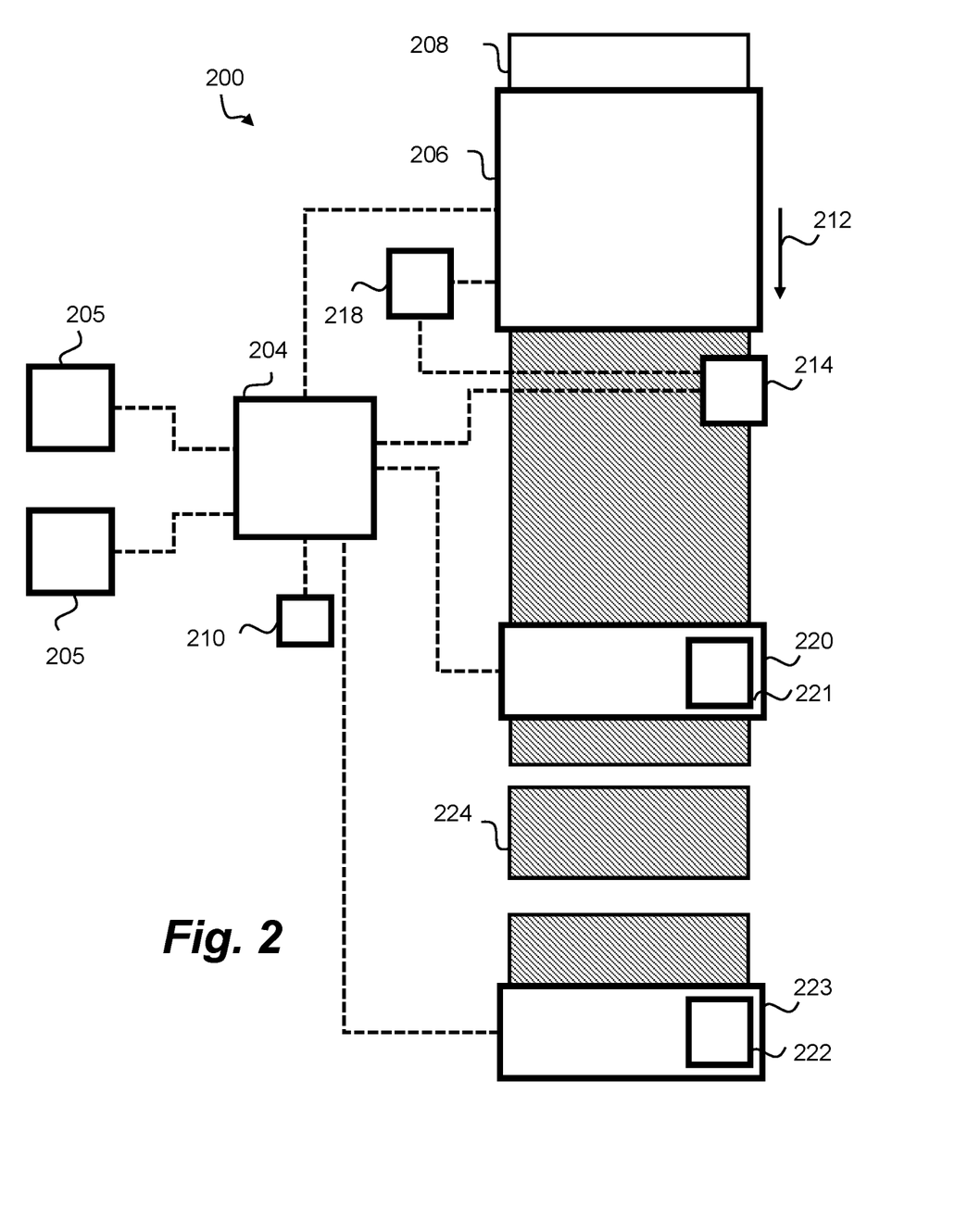
FIG. 2 is a diagrammatic representation of a printing system in accordance with an example.

FIG. 2 is a diagrammatic representation of a printing system 200 in accordance with an example. In the printing system 200, print job data, and therefore image data, is received by the digital front end 204. In this example, the printing apparatus comprises a printer 206 to print the image, as well as additional pre-print components arranged before the printer, and additional post-print components arranged after the printer. The printer 206 is communicatively coupled to the DFE 204 via one or more wired or wireless communication paths, depicted as dashed lines in the Figure. In this way, data is transmitted between the DFE 204 and the printer 206. The printer 206 may be a digital printer or an offset printer, for example, and is configured to apply printing fluid, such as printing ink, to a substrate 208. In FIG. 2, the substrate 208 is depicted as a web substrate, such as a continuous roll of paper, which is later cut into individual portions. The substrate travels in a print direction, indicated by arrow 212. In other examples, the substrate may already be cut into individual portions before being printed upon.

The image data 102 and/or print job data may be received from any computing components communicatively coupled to the DFE 204. The data may be received from one or more computer terminals 205 that are communicatively coupled to the DFE 204. For example, the computer terminals may be connected to the DFE 204 via a computer network, such as the Internet, or they may be collocated with the DFE 204. Additionally, or alternatively, the image data 102 and/or print job data may be received from a storage medium 210. The storage medium 210 may be collocated with the DFE 204, or may be connected via the Internet for example. In one example, the storage medium 210 is a cloud server.

Upon receipt of the image data and/or print job data, the DFE 204 processes the image data and/or print job data in order to print an image using the printer apparatus 206. For example, one function of the DFE may be to rasterize the image data to convert the image data into a bitmap format. Hence, in some examples the DFE incorporates Raster Image Processing techniques if the digital file is in a format that cannot be interpreted by the printer.

As mentioned, in some instances, the image data may comprise one or more control marks. For example, the image data may include an image to be printed and one or more images of control marks that were added prior to the image data being received by the DFE 204. To prepare the printer 206 and any other pre-print, or post-print components of the system 200, the DFE is configured to implement a method whereby one or more control marks are detected within the image data. For example, the computer implemented method may comprise the DFE 204 determining a presence of the control mark in the image data. This may include parsing, or scanning the image data, or a portion of the image data, to locate a control mark in the image data.

In one example, the DFE 204 parses the image data to determine the presence of a control mark by using a reference database which comprises one or more standard control marks. The DFE may therefore compare each entry in the reference database against the image data to determine whether the image data comprises any of the standard control marks. Each standard control mark may be associated with a specific arrangement of pixels, for example, and the DFE 204 is configured to search and locate the specific arrangement of pixels. In some examples, standard control marks are located and placed within certain regions of an image, hence the DFE may not parse the whole image but certain regions to increase the efficiency in which the control marks are detected.

In some examples, the reference database associates each control mark with a specific function. For example, a registration mark may be associated with a specific set of instructions that are to be implemented by one or more components of the printing system 200 to achieve registration. A cutting mark may also be associated with a specific set of instructions that are to be implemented by one or more components of the printing system 200 to achieve cutting of the substrate at the correct location.

If the DFE 204 determines that a control mark is present within the image data, the DFE is configured to generate control data for the printing system 200 based on the control mark. The control data may include an indication of the presence of the control mark. For example, the control data may specify that the image data is associated with a specific control mark, e.g. a registration or cutting mark, and as such, the instructions associated with the control mark should be implemented within the printing system. In some examples the DFE also determines a location of the control mark in the image data. For example, the DFE may store a coordinate of the control mark. Hence, in some examples, the control data further includes an indication of the location of the control mark. The location may be defined with reference to the image data, or with reference to the location on the printed substrate. In some examples, the control data includes information from the reference database, such as details of, or pointers to a specific set of instructions that are to be implemented based on a control mark. However, in other examples the reference data is accessible by various components in the system 200, such that the control data need not comprise information from the reference database.

Thus, by implementing the above method, the DFE 204 has determined that the image data comprises one or more control marks without the DFE being used to specifically add these to the image data. In some examples the DFE 204 also adds control marks to the image data and includes an indication of these control marks in the control data, in addition to those detected.

Once aware of the presence and/or location of the control marks, the DFE can inform other components of the system 200 that these control marks are being used. To do this, the DFE transmits the control data, or a relevant subset of the control data to the various components of the system 200. In some examples, the control data also includes other print information used in the printing process, such as the printer settings, and the bitmap produced by the DFE 204 during rasterization. In other examples, the print information is transmitted separately. Components configured to receive the control data, such as the printer 206, may comprise electronic circuitry, such as a processor or microprocessor and memory that implements an application programming interface to receive the control data. The control data can be used within the system to augment the printing and calibration processes. Hence, by providing control data, these processes can be correlated with the print job. In one example, the control data comprises an indication of a "Front to Back" control mark that was detected within the image data by the DFE 204. A front to back mark can indicate that dual sided printing is to be used. Hence, by providing the control data to the components of the system 200, a dual engine print press can accurately synchronize printing on both sides of the substrate.

As mentioned, printing fluid is applied to the substrate 208 by the printer 206. To do so, the printer 206 receives the print information and/or control data from the DFE 204. The ink applied by the printer 206 will form the printed image, which includes the image to be printed as well as one or more control marks. These control marks may have been added by the user and were thus present in the image data received by the DFE, and/or may have been added by the DFE itself. The "image to be printed" refers to the component of the image data that corresponds to the image that the user desired to print, and does not include any standard control marks. The "image data" received by the DFE thus includes both data corresponding to the image to be printed, and data corresponding to any control marks added by the user before submitting the print job data to the DFE.

Once the printed image is formed on the surface of the substrate 208, an imaging device, such as camera 214, may image certain regions of the substrate 208 to detect the presence and/or position of the control marks.

In some examples, the imaging device 214 receives the control data from the DFE, either directly or indirectly, via one or more communication paths. Hence, the imaging device 214 may be aware of the presence and/or location of one or more control marks within the image data. Using this control data, the imaging device may capture images of the printed substrate, and hence images of the control marks. For example, if the control data indicates the location of one or more control marks, the imaging device may position itself relative to the substrate 208 to ensure that its field of view encompasses the location of the control mark being imaged.

If images of the control marks are captured by the imaging device 214, captured image data may be transmitted to other elements within the printing system 200. For example, the imaging device 214 may transmit this data to the DFE 204, to the printer 206, or to any other pre-print components, such as the calibration assembly 218, or post-print components, such as the cutting assembly 220 and the folding assembly 222.

The calibration assembly 218 may be configured to perform any number of calibration procedures, including, but not limited to: registration calibration, scaling calibration, and colour calibration. The calibration assembly 218 may comprise one or more processors and memory. In some examples, the calibration assembly is a separate system, as depicted in FIG. 2. However, in other examples the printer 206 may comprise instructions and/or dedicated circuitry configured to perform the procedures used for calibration. In a further example, the calibration procedures may be performed by the DFE 204.

In one example, the calibration assembly 218 receives data from the imaging device 214, such as one or more captured images of the printed substrate 208. For example, the captured image may include images of one or more control marks printed onto the substrate 208. In addition, the calibration assembly 218 may also receive the control data from the DFE 204, and thereby use the control data to calibrate printing. Using the captured images and the control data, the calibration assembly 218 can implement instructions associated with detected control marks.

Using the captured image data and control data, the calibration assembly 218 may perform a registration calibration procedure. For example, the captured image may comprise a captured image of a registration control mark. The control data may indicate that the registration control mark is expected to be present in the captured image, and may also indicate instructions of a procedure to be performed based on the control mark. For example, using the captured data, it can be determined whether any colour separations printed by the printer 206 are misaligned. If it is determined that one or more separations are misaligned, the registration calibration procedure may determine a correction factor that should be applied by the printer 206. For example, one or more updated alignment settings for the printer 206 may be determined. This data can be transmitted to the printer 206, so that any further images printed by the printer 206 are modified to improve and/or correct alignment. This procedure may be iterated one or more times until it is determined that no further corrections are to be performed.

Similarly, using the captured image data and control data, the calibration assembly 218 may perform a scaling calibration procedure. For example, the captured image may comprise a captured image of a scaling control mark, which may also be known as a Continuous Scaling Control (CSC) mark. The control data may indicate that the scaling control mark is expected to be present in the captured image, and may also indicate instructions of a procedure to be performed based on the control mark. For example, using the captured data it can be determined whether the image printed by the printer 206 is scaled correctly. If it is determined that the image is not scaled correctly, the scaling calibration procedure may determine a correction factor that should be applied by the printer 206. For example, one or more updated scaling settings for the printer 206 may be determined. This data can be transmitted to the printer 206, so that any further images printed by the printer 206 are more likely to comprise correctly scaled images. This procedure may be iterated one or more times until it is determined that no further corrections are to be performed.

Similarly, using the captured image data and control data, the calibration assembly 218 may perform a colour calibration procedure. For example, the captured image may comprise a captured image of a reference colour control mark, which may also be known as a Colour Calibration Control (CCC) mark. The control data may indicate that the colour control mark is expected to be present in the captured image, and may also indicate instructions of a procedure to be performed based on the control mark. For example, using the captured data it can be determined whether the image printed by the printer 206 is coloured correctly. If it is determined that the image is not coloured correctly, the colour calibration procedure may determine a correction factor that should be applied by the printer 206. For example, one or more updated colour settings for the printer 206 may be determined. This data can be transmitted to the printer 206, so that any further images printed by the printer 206 are more likely to comprise correctly coloured images. This procedure may be iterated one or more times until it is determined that no further corrections are to be performed.

As mentioned, the imaging device 214 may also transmit data to the cutting assembly 220. The cutting assembly 220 may be configured to perform a cutting procedure, whereby the substrate 208 is cut, cropped or trimmed at the correct position according to cutting control marks printed onto the substrate 208. For example, the cutting assembly 220 receives data from the imaging device 214, such as one or more captured images of the printed substrate 208. The captured image may include images of one or more cutting control marks printed onto the substrate 208.

The cutting assembly 220 may comprise one or more processors and memory and components for cutting the substrate 208. In some examples, the cutting assembly does not receive data from the imaging device 214, and may instead comprise its own imaging device 221. In some examples, data is received from both imaging devices 214, 221. Regardless of how the cutting assembly 220 receives the captured image data, the cutting assembly 220 is configured to cut the substrate 208 into separate sheets 224. In some examples, the cutting assembly 220 and/or imaging device 221 also receives control data from the DFE 204. The imaging device 221 may position itself based on the control data, for example in a position able to detect the presence of the cutting control mark.

As mentioned, the imaging device 214 may also transmit data to the folding assembly 222. The folding assembly 222 may be configured to perform a folding or scoring procedure, whereby the substrate 208 is folded and/or scored at the correct position according to folding control marks printed onto the substrate 208. For example, the folding assembly 222 receives data from the imaging device 214, such as one or more captured images of the printed substrate 208. The captured image may include images of one or more folding control marks printed onto the substrate 208.

The folding assembly 222 may comprise one or more processors and memory and components for folding and/or scoring the substrate 208. In some examples, the folding assembly does not receive data from the imaging device 214, and may instead comprise its own imaging device 223. In some examples, data is received from both imaging devices 214, 223. Regardless of how the folding assembly 222 receives the captured image data, the folding assembly 222 is configured to fold/cut the substrate 208 as desired. In some examples, the folding assembly 222 and/or imaging device 223 also receives control data from the DFE 204. The imaging device 223 may position itself based on the control data, for example in a position able to detect the presence of the folding control mark.

In the above described procedures, the generation of control data based on detected control marks allows the system 200 to improve a workflow. By being provided with the control data, the efficiency of procedures implemented by the calibration assembly 218, the printer 206, the cutting assembly 220, the folding assembly 222, and one or more imaging devices 214, 221, 223 can be improved.

To further improve the efficiency, the DFE 204 may determine the presence of the control mark in the image data when instructed to do so. For example, a user may specify in the print job that their digital file comprises control marks, and as such, the DFE may responsively parse the image data for the presence of control marks. The user may indicate this within instruction data for the print job, and the instruction data may therefore comprise a flag indicating that the DFE is to automatically determine the presence of a control mark in the image data. If the flag is not set, the DFE may not parse the image data, thus saving processing resources.

In some examples, the instruction data may also provide an indication of which control mark(s) are included in the image data. Hence, the DFE 204 may know which specific control marks to search for, which therefore further improves processing efficiency. For example, the DFE 204 may therefore not compare every entry in the reference database against the image data, but only those indicated by the user in the instruction data.

Figure 3:
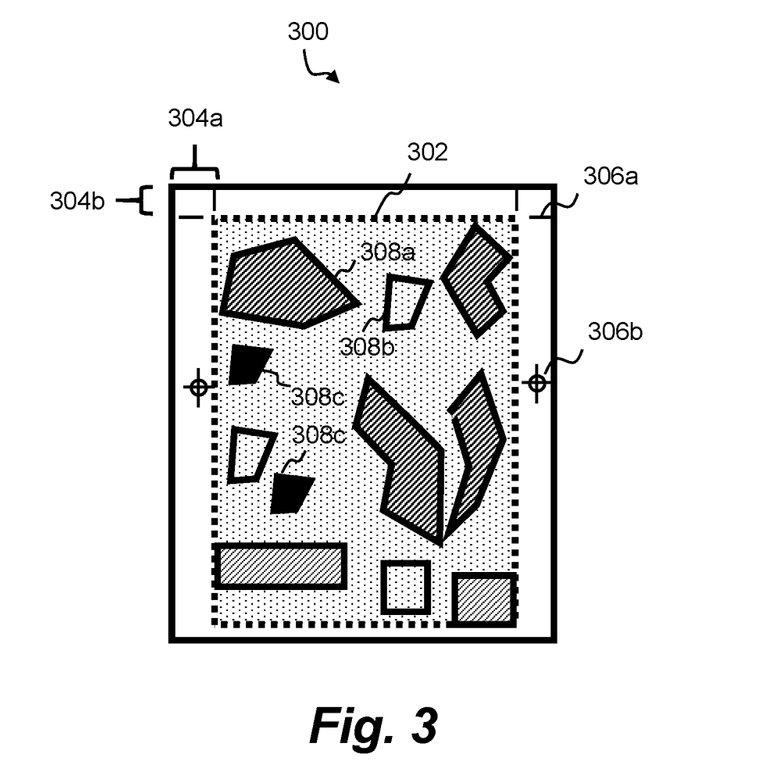
FIG. 3 is a diagrammatic representation of image data in accordance with an example.

FIG. 3 is a diagrammatic representation of image data 300 in accordance with an example. The image data 300 comprises an image to be printed 302, which is the region/area bounded by the imaginary dashed line. The image to be printed corresponds to the "useful" image that the user created. The image to be printed therefore does not comprise any standard control marks. The region outside of the image to be printed, such as the area found in the margins 304a, 304b, may include one or more standard control marks 306, such as the cutting control mark 306a, and the registration control mark 306b. During the design process, the user has control over all of the image data 300. For example, the area within the margins 304a, 304b are accessible to the user, such that the user can place or draw the control marks 306b in the margins 304a, 304b.

It can be seen that due to the presence of these standard control marks 306 within the margin, blank space on the substrate will be wasted once the image to be printed and the standard control marks have been printed onto the substrate. To lessen this effect, some features of the image to be printed 302 can comprise "hidden" non-standard control marks, such that a control mark is a component of the image to be printed, rather than being located in a region outside of the image to be printed.

In one example, the image to be printed 302 comprises one or more features 308a, 308b, 308c. Each referenced feature may comprise a certain colour or shape, for example. In one example, the features correspond to different objects within the image 302. The user may specify within the print job that a feature within the image to be printed is to be used as a control mark. This means that the equivalent "standard" control mark does not need to be printed, which can help save space on the substrate. A standard control mark here refers to control marks that are usually used and associated with the particular control mark function.

In one example, the two features 308c may be designated as scaling control marks. This designation may be an automated procedure, or a user may manually specify these features are to be used. During the scaling calibration procedure, scaling may be set/fixed based on the vertical scaling of these control marks, for example. Accordingly, space on the substrate can be saved.

In some examples therefore, the DFE may also receive an indication that the image data comprises "non-standard" control marks that are components of the image to be printed. The DFE may also receive an indication of the appearance of the control mark, such that its presence and/or location can be determined by the DFE when the image data is parsed by the DFE. This procedure can be performed alternative to, or in addition to the DFE parsing portion 302 within the image data to determine whether portion 302 comprises any standard control marks. In some examples the DFE also adds an entry to the control mark reference database corresponding to the non-standard control mark.

Figure 4:
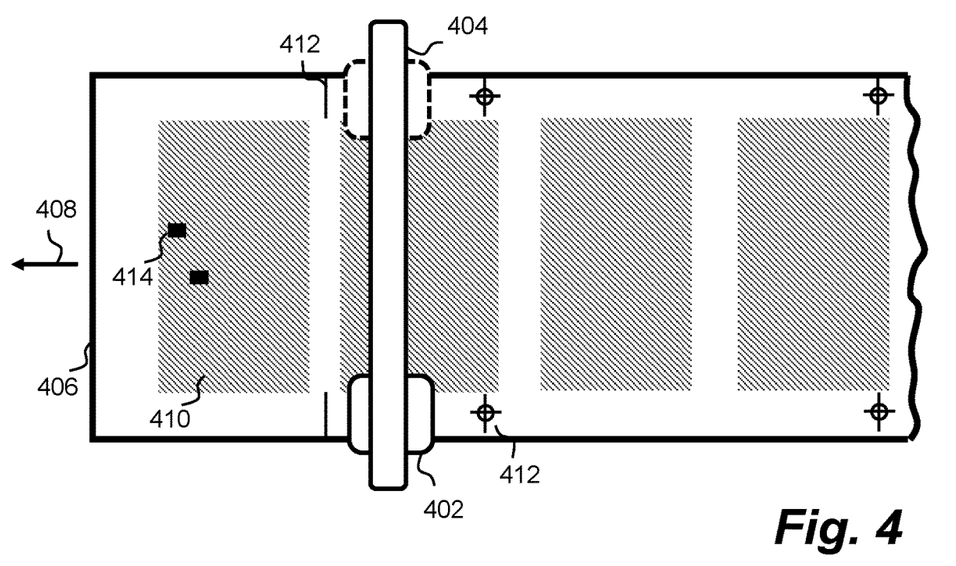
FIG. 4 is a diagrammatic representation of a plan view of a portion of the printing system in accordance with an example.

FIG. 4 is a diagrammatic representation of a plan view of a portion of a printing system in accordance with an example. The portion of the printing system may be a portion of printing systems 100 or 200, for example.

The printing system comprises an imaging device 402 moveable along a rail 404. As such, the imaging device 402 can image regions of the substrate 406 which moves beneath the imaging device, in a transport direction indicated by arrow 408. The substrate 406 has printed thereon, a printed image, which includes an image region corresponding to the image to be printed 410 and one or more control marks 412. As explained in relation to FIG. 3, the region corresponding to the image to be printed 410 may also comprise one or more non-standard control marks 414.

To detect these control marks 412, 414, the imaging device can move across the substrate in a direction perpendicular to the transport direction 408. In other examples however, the imagining device can also move parallel to the transport direction, and/or in the vertical direction, such as in a direction into and out of the page. In FIG. 4, the imaging device is located at a first position, as shown by the solid line. The imaging device 402 may move to a second position, indicated by the dashed line.

In some examples, the positioning of the imaging device 402 is changed based on the control data generated by the DFE. For example, the control data may include an indication of the location of a control mark. As such, upon receipt of the control data, the imaging device 402 may adjust its position so that it is able to capture an image of the control mark located on the substrate 406. Hence, the control data allows the imaging device to more effectively detect the presence of the control marks on the substrate.

Figure 5:
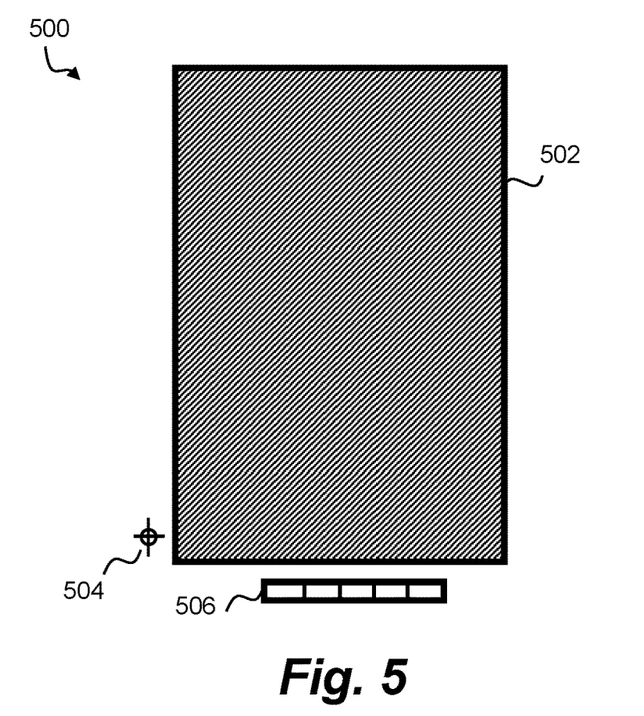
FIG. 5 is a diagrammatic representation of image data in accordance with an example.

FIG. 5 is a diagrammatic representation of image data 500 in accordance with an example. The image data 500 comprises an image to be printed 502 and one or more standard control marks, such as the registration control mark 504, and the colour control mark 506.

As depicted, the image data 500 received by the DFE includes one image to be printed 502. The image, once printed onto a substrate will occupy a certain area on the substrate. To maximize space on the substrate, imposition may be applied. Imposition refers to the process whereby the image to be printed is replicated and arranged so that when printed onto a substrate, space is maximized. This ensures that blank space is minimized, which may save costs and materials associated with the print job.

Figure 6:
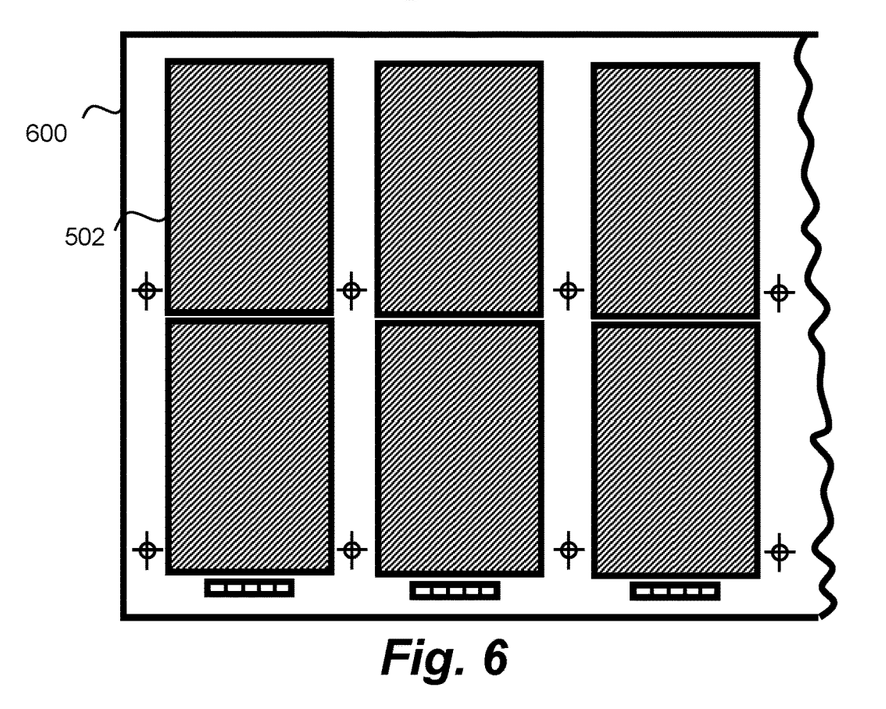
FIG. 6 is a diagrammatic representation of imposition applied to the image data of FIG. 5 in accordance with an example.

FIG. 6 is a diagrammatic representation of a substrate for which imposition has been applied to the image data of FIG. 5. In this example, the image to be printed 502 has been replicated and arranged before being printed on to the substrate 600. In this example, this means that two sets of the image to be printed 502 fit along the width of the substrate 600. However, rather than also replicating all of the control marks 504, 506 present in the image data 500, a subset may be replicated and printed. For instance, control mark 504 has been replicated for every image to be printed 502, whereas control mark 506 has not, to ensure that two sets of the image to be printed fit along the substrate. Thus, in some examples a subset of the plurality of control marks are printed, which can further help maximize space on the substrate. Hence, it may be determined that not all of the control marks need to be replicated. In some examples, this determination may be made based on the type of control mark.

Accordingly, the DFE may be configured to generate updated image data, referred to as "print data", comprising two or more sets of the image to be printed. While the image data originally comprised a plurality of control marks, the print data may comprise a subset of the plurality of control marks. The print data may also comprise data corresponding to a subset of the plurality of control marks. Hence, control data generated by the DFE includes an indication and/or location of the presence of a subset of the plurality of control marks.

In one example, the DFE detects control marks 504 and 506, as well as the image to be printed 502. To create the print data, the DFE may import the image to be printed 502 into an imposition template, and the detected control marks 504, 506 can be imported into the imposition template in different locations and/or in different quantities. For example, not all of the detected control marks are replicated the same number of times as the image to be printed 502. An imposition template may be similar to that shown in FIG. 6, but with blank regions in the locations 502.

In one example, not all detected control marks are replicated within the print data. For example, in some examples, control marks are removed entirely from the print data.

Figure 7:
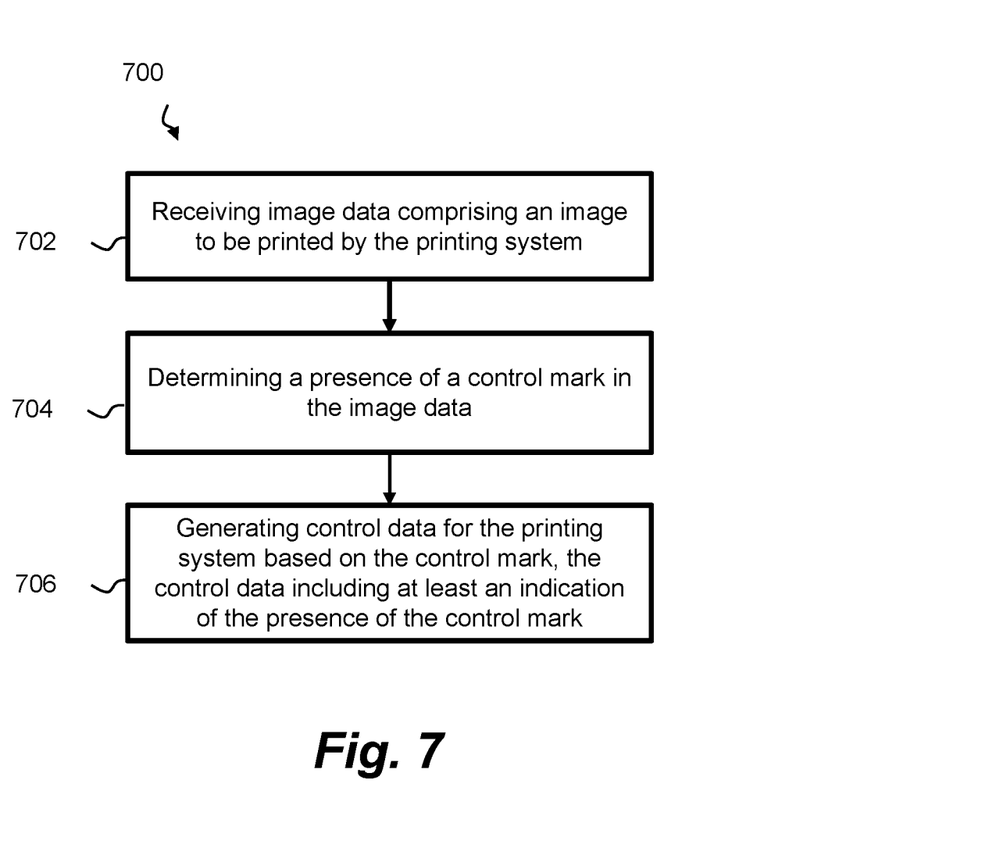
FIG. 7 is a flow diagram showing a method of generating control data for a printing system in accordance with an example.

FIG. 7 is a flow diagram showing a method 700 according to an example. The method can be performed by the example digital front end 104, 204 discussed in relation to FIGS. 1 and 2, and is a method of generating control data for a printing system 100, 200. The method may be computer implemented.

At block 702, the method comprises receiving image data comprising an image to be printed by the printing system. At block 704, the method comprises determining a presence of a control mark in the image data. At block 706, the method comprises generating control data for the printing system based on the control mark, the control data including at least an indication of the presence of the control mark.

In some examples, the method may further comprise determining a location of the control mark in the image data, wherein the control data further includes an indication of the location of the control mark.

In some example methods, the control mark is a component of the image to be printed. In some example methods, the control mark is located in a region outside of the image to be printed within the image data.

In some examples, the method may further comprise receiving instruction data for a print job associated with the image data at a digital front end of the printing system, and determining whether the instruction data comprises a flag, the flag indicating that the digital front end is to automatically determine the presence of the control mark in the image data. Hence, determining the presence of the control mark in the image data is performed by the digital front end responsive to the instruction data comprising the flag.

In some examples, the method may further comprise generating print data comprising two or more sets of the image to be printed, the image data comprising a plurality of control marks. Accordingly, generating control data for the printing system comprises generating control data including an indication of the presence of a subset of the plurality of control marks. Such a method is described in relation to FIGS. 5 and 6.

In some example methods, parsing the image data comprises parsing a portion of the image data to locate a control mark in the image data.

Certain system components and methods described herein may be implemented by way of non-transitory computer program code that is storable on a non-transitory storage medium. In some examples, the digital front end may comprise a non-transitory computer readable storage medium comprising a set of computer-readable instructions stored thereon. The DFE may further comprise one or more processors.

Figure 8:
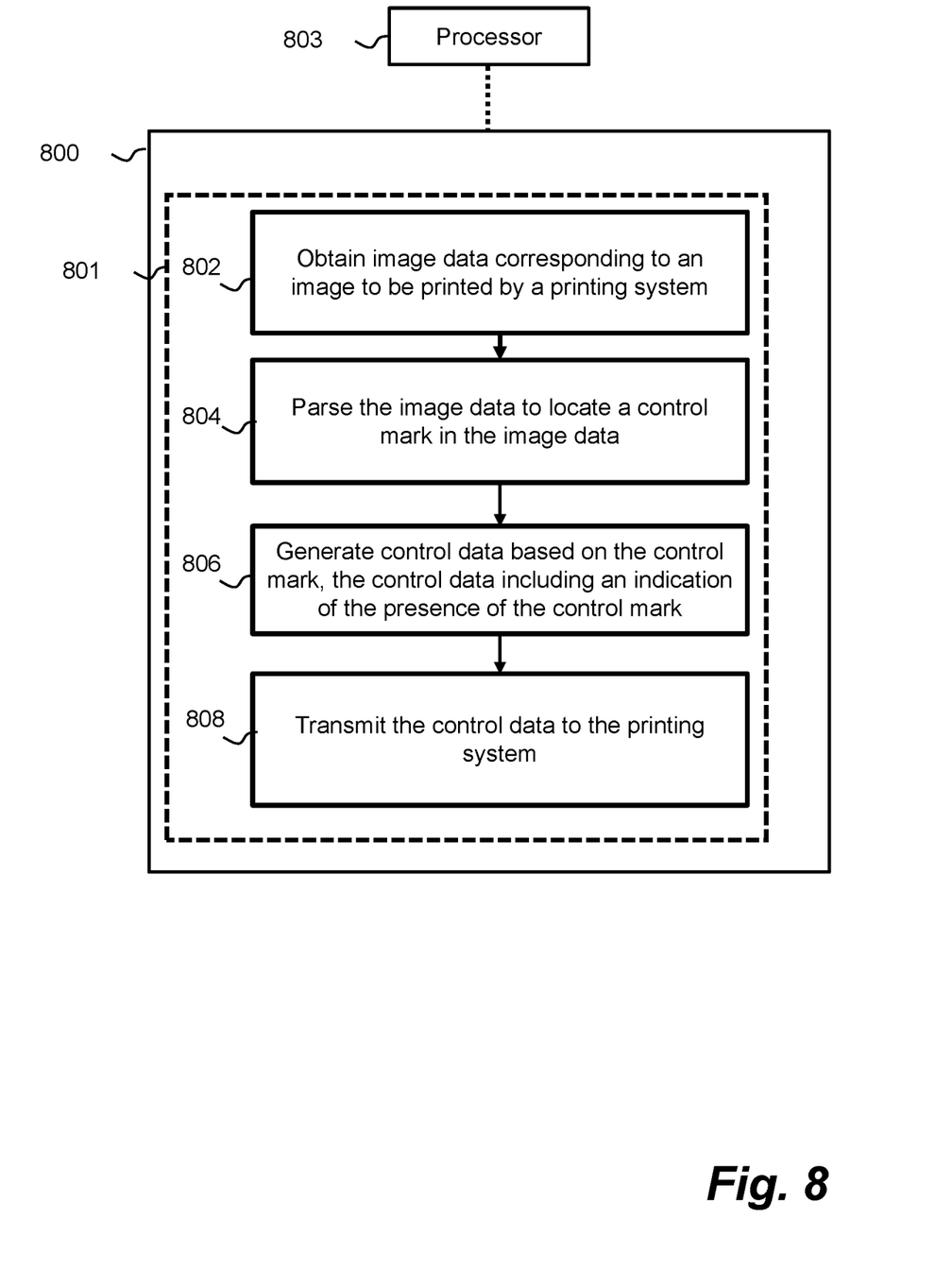
FIG. 8 is a diagrammatic representation of an example set of computer-readable instructions within a non-transitory computer-readable storage medium.

FIG. 8 shows an example of such a non-transitory computer-readable storage medium 800 comprising a set of computer readable instructions 801 which, when executed by at least one processor 803, cause the processor(s) 803 to perform a method according to examples described herein. The computer readable instructions 800 may be retrieved from a machine-readable media, e.g. any media that can contain, store, or maintain programs and data for use by or in connection with an instruction execution system. In this case, machine-readable media can comprise any one of many physical media such as, for example, electronic, magnetic, optical, electromagnetic, or semiconductor media. More specific examples of suitable machine-readable media include, but are not limited to, a hard drive, a random access memory (RAM), a read-only memory (ROM), an erasable programmable read-only memory, or a portable disc.

In an example, instructions 801 cause the processor 803 to, at block 802, obtain image data corresponding to an image to be printed by a printing system. At block 804, the instructions 801 cause the processor 803 to parse the image data to locate a control mark in the image data. At block 806, the instructions 801 cause the processor 803 to generate control data based on the control mark, the control data including an indication of the presence of the control mark. At block 808, the instructions 801 cause the processor 803 to transmit the control data to the printing system.

In some examples, the instructions 801 may further cause the processor 803 to determine a location of the control mark in the image data and generate the control data to include an indication of the location of the control mark.

In some examples, parsing the image data comprises parsing a portion of the image data to locate a control mark in the image data.

In some examples, the instructions 801 may further cause the processor 803 to obtain instruction data for a print job associated with the image data and determine whether the instruction data comprises a flag, the flag indicating that the processor is to automatically parse the image data to locate a control mark in the image data. Accordingly, parsing the image data to locate the control mark in the image data is performed by the processor responsive to the instruction data comprising the flag.

The described printing system therefore improves the printing process when a user includes control marks in the image data.

The preceding description has been presented to illustrate and describe examples of the principles described. This description is not intended to be exhaustive or to limit these principles to any precise form disclosed. Many modifications and variations are possible in light of the above teaching. It is to be understood that any feature described in relation to any one example may be used alone, or in combination with other features described, and may also be used in combination with any features of any other of the examples, or any combination of any other of the examples.

What is claimed is:

1. A computer-implemented method of generating control data for a printing system, the method comprising:
receiving image data comprising an image to be printed by the printing system;
receiving instruction data for a print job associated with the image data to be printed by the printing system;
determining a presence of a control mark in the image data in response to receiving a flag associated with the instruction data, wherein the flag indicates a digital front end is to determine the presence of the control mark; and
generating control data for the printing system based on the control mark, the control data including at least an indication of the presence of the control mark.

2. The method of claim 1, comprising:
determining a location of the control mark in the image data;
wherein the control data further includes an indication of the location of the control mark.

3. The method of claim 1, wherein the control mark is a component of the image to be printed.

4. The method of claim 1, wherein the control mark is located in a region outside of the image to be printed within the image data.

5. The method of claim 1, comprising:
receiving the instruction data for the print job associated with the image data at the digital front end of the printing system; and
determining whether the instruction data comprises the flag, the flag indicating that the digital front end is to automatically determine the presence of the control mark in the image data;
wherein determining the presence of the control mark in the image data is performed by the digital front end responsive to the instruction data comprising the flag.

6. The method of claim 1, comprising:
generating print data comprising two or more sets of the image to be printed, the image data comprising a plurality of control marks;
wherein generating control data for the printing system comprises generating control data including an indication of the presence of a subset of the plurality of control marks.

7. A printing system comprising:
a digital front end comprising a processor and memory; and
a printing apparatus communicatively coupled to the digital front end;
wherein the digital front end is to:
receive image data comprising an image to be printed by the printing apparatus;
receive instruction data for a print job associated with the image to be printed by the printing apparatus;
determine a presence of a control mark in the image data in response to receiving a flag associated with the instruction data, wherein the flag indicates the digital front end is to determine the presence of the control mark;

generate control data based on the control mark, the control data including an indication of the presence of the control mark; and transmit the control data to the printing apparatus.

8. The printing system of claim 7, wherein the digital front end is configured to convert the image data to raster data for printing.

9. The printing system of claim 7, wherein the printing apparatus comprises a printer to print the image, wherein the control data is used to calibrate the printing of the image.

10. The printing system of claim 9, wherein the printing apparatus comprises at least one of:
- a pre-print component arranged before the printer that is configured based on the control data; and
- a post-print component arranged after the printer that is configured based on the control data.

11. The printing system of claim 7, wherein the printing apparatus comprises electronic circuitry that implements an application programming interface to receive the control data.

12. A non-transitory computer-readable storage medium storing instructions that, when executed by a processor, cause the processor, to:
- obtain image data corresponding to an image to be printed by a printing system;
- obtain instruction data for a print job associated with the image to be printed by the printing system;
- parse the image data to locate a control mark in the image data in response to receiving a flag associated with the instruction data, wherein the flag indicates a digital front end is to determine the presence of the control mark;
- generate control data based on the control mark, the control data including an indication of the presence of the control mark; and
- transmit the control data to the printing system.

13. The non-transitory computer-readable storage medium of claim 12, wherein the instructions, when executed by the processor, further cause the processor, to:
- determine a location of the control mark in the image data; and
- generate the control data to include an indication of the location of the control mark.

14. The non-transitory computer-readable storage medium of claim 12, wherein the instructions, when executed by the processor, further cause the processor, to:
- parse a portion of the image data to locate a control mark in the image data.

15. The non-transitory computer-readable storage medium of claim 12 wherein the instructions, when executed by the processor, further cause the processor, to:
- determine whether the instruction data comprises the flag, the flag indicating that the processor is to automatically parse the image data to locate the control mark in the image data;
- wherein parsing the image data to locate the control mark in the image data is performed by the processor responsive to the instruction data comprising the flag.

* * * * *